Figure 1:
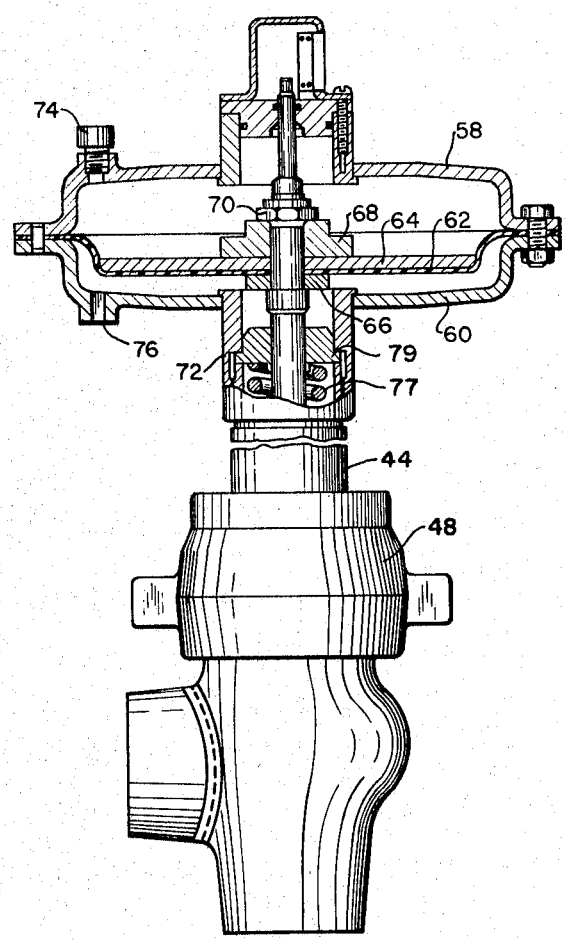

INVENTOR
MATHEW L. FREEMAN

BY Strauch, Nolan & Neale

ATTORNEYS

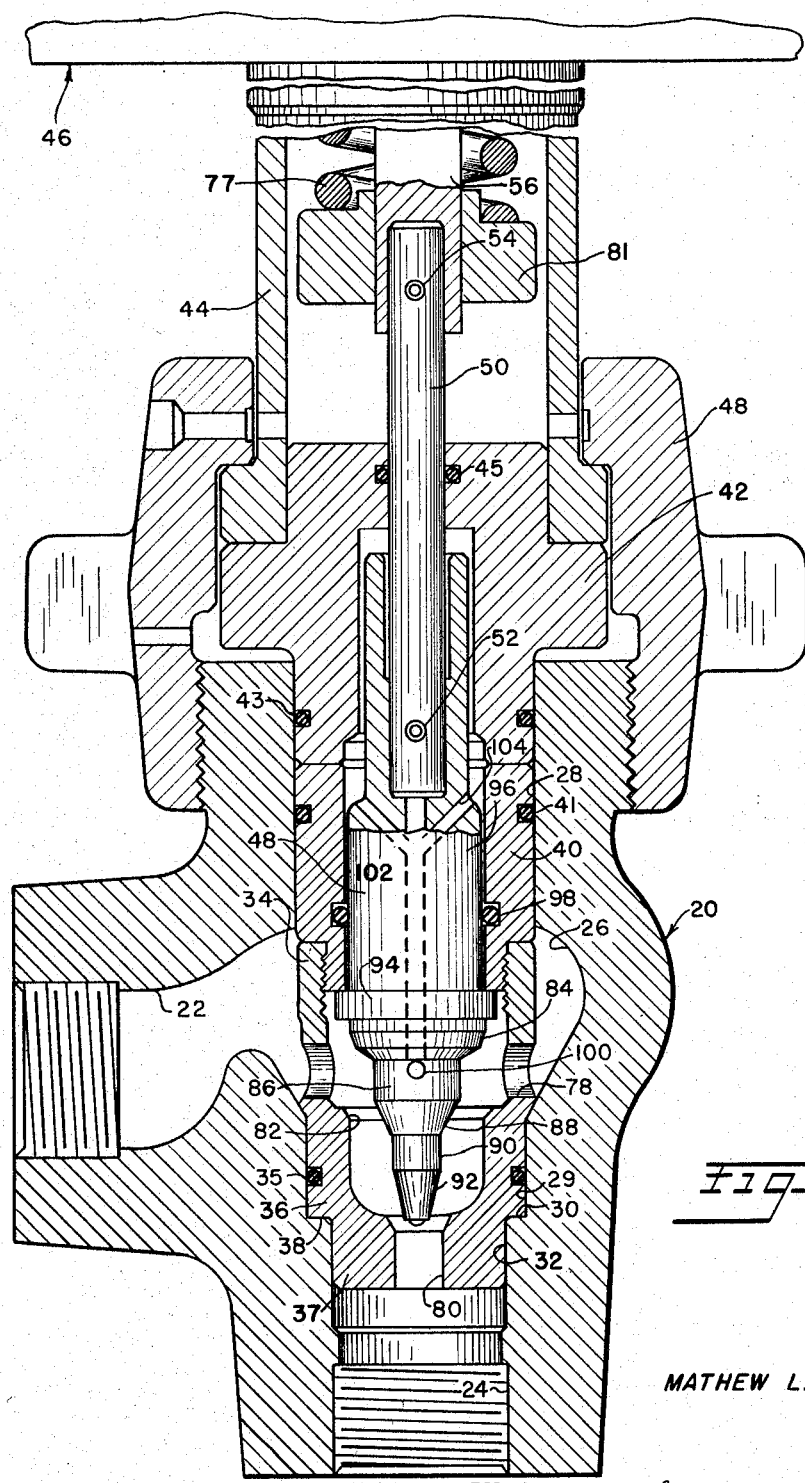

United States Patent Office 3,298,389
Patented Jan. 17, 1967

3,298,389
PRESSURE BALANCED VALVE
Mathew L. Freeman, Crown Point, Ind., assignor to Rockwell Manufacturing Company, Pittsburgh, Pa., a corporation of Pennsylvania
Filed July 7, 1964, Ser. No. 380,818
2 Claims. (Cl. 137—454.6)

This invention relates to valves and more particularly to reduced port high pressure-drop valves especially useful under severe service conditions such as continuous high pressure drop throttling service where conventional valves are subject to rapid deterioration.

Valves of the type with which the present invention is concerned may be required to undergo several thousand opening and closing cycles a day while handling corrosive or abrasive fluids supplied at a pressure differential of 1,000 to 6,000 p.s.i.

Under these service conditions conventional valves are subject to rapid erosion by abrasion and cavitation. Even valves provided with tungsten carbide surfaces on the parts subjected to greatest wear are rendered unserviceable in periods as short as six months. The nature of the wear patterns is such that the valve body itself may be subject to severe erosion by the cutting action of the fluids thus making it necessary to replace the entire valve or to resort to expensive and time consuming repair.

It is accordingly, a principal purpose and object of the present invention to provide novel valve constructions particularly adapted for pressure-drop throttling service having substantially increased resistance to wear and in which the wear is largely confined to replaceable or non-critical parts.

In attaining this object and related objects the present invention provides novel valves incorporating means for reducing the fluid velocity at the contact joint between the valve seat and the valve closure member and means to transfer high velocity flow to areas away from the closure member and the seat joint surfaces. In the valves of the present invention the pressure drop occurs across a restricted flow passage upstream or downstream of the valve seat. Accordingly, the throttling surfaces formed by the restricted flow passage may be of extremely hard and even brittle metal whereas the valve seating surfaces may be formed of metal having somewhat reduced wear resistance but possessing the necessary characteristics to sustain the high contact pressure required for drop tight sealing without danger of cracking.

It is accordingly a further object of the present invention to provide improved valve constructions in which the separation of the surfaces subject to erosion from the sealing surfaces permits the use of different optimum materials for the seating surfaces and the surfaces across which the pressure drop occurs.

Valves of the type with which the present invention is concerned are generally diaphragm operated since an operator of this type is relatively economical, is subject to remote control, and is reliable. However, conventional diaphragm operated valves used in high pressure drop service and/or erosive service often jerk open and slam closed causing severe water hammer effects and vibrations and damage to surrounding piping and equipment as well as to the valve itself. When the valve is slammed closed internal damage may also occur at the seat joint or at the stem and the vibration caused by impact may produce packing leaks. Also, valves tend to chatter particularly when they are partially opened and are used for throttling service at low flow rates. This chattering leads to rapid deterioration of the valve seating surfaces. Opening thrust varies widely with the variation in upstream pressure causing improper control. In some cases a change in flow, requiring a change in seat port diameter, may necessitate installing a larger diaphragm actuator to handle the increased opening thrust or, conversely, the valve operating performance characteristics are altered and may be severely lowered for large ports.

With these considerations in mind, it is a further important advantage of another aspect of the present invention to provide novel valve constructions which eliminate or greatly reduce the disadvantages of prior valves discussed above and provide improved control of the rate at which the valve is opened and closed and for the force required for opening and closing action.

It is also an object of the present invention to provide novel means for controlling valve opening and closing rates and also for varying this rate in relation to the position of the valve closure member with respect to the valve seat.

It is an additional object of the present invention to provide improved valve constructions including means for rapidly accelerating the valve closure member when the valve is initially opened and to reduce the throttling action across the valve seating surfaces and to decelerate the valve closure member as it approaches closed position to reduce water hammer and mechanical damage to the valve seating surfaces.

It is a more specific object of the present invention to provide an improved pressure balanced valve construction by which the valve closure member may be balanced, partially balanced or unbalanced at a given stroke position and change its degree of balance and its velocity as a function of its position to accomplish a desired flow control action.

It is also an object of the present invention to provide an improved pressure balanced valve construction which permits the utilization of a valve seat considerably larger than the valve port and which thus permits the use of one valve seat size for a plurality of valve port sizes.

It is a further object of the present invention to provide improved valve structures which incorporate a unique pressure balancing system which permits the valve to open with substantially reduced thrust requirements regardless of change in upstream pressure of flow port size.

Additional objects and advantages of the present invention will become apparent as the description proceeds in connection with the accompanying drawings in which:

FIGURE 1 is a side elevation of a valve constructed in accordance with the present invention with parts broken away to show the interior details; and FIGURE 2 is an enlarged fragmentary central vertical section of the valve of FIGURE 1.

Referring now more particularly to the drawings the valve illustrated herein is capable of handling water, oil, or gas including fluids which are highly erosive or abrasive at high differential pressures over extended periods of time.

The body 20 of the valve has a pair of flow passages 22 and 24 which terminate at their inner ends in an enlarged chamber 26. The outer ends of the passages 22 and 24 may be threaded or provided with flanges for attachment to fluid pressure lines in accordance with conventional practice. A cylindrical bore 28 extends from the upper end of valve body 20 through the upper portion of the central valve chamber 26. The lower portion of chamber 26 has a reduced cylindrical bore 29 which terminates at its lower end in a shoulder 30 formed at the upper end of a reduced bore 32. The bores 28, 29 and 32 are concentric with the flow passage 24.

A flow cage 34, described in detail below, is received with a close clearance fit in the lower portion of the bore 28 and has portions 36 and 37 of reduced diameter received in the bores 29 and 32. The parts are sealed by an O-ring 35. A shoulder 38 on the flow cage 34 rests on the shoulder 30 on the valve body to hold the flow cage against downward movement with respect to the valve body. Threaded into the upper end of the flow cage 34 is an annular balancing cylinder 40, the upper end of which is engaged by the lower end of a reduced portion of a gland member 42. The gland 42 and the lower end of a tubular support 44 for the diaphragm actuator assembly indicated generally at 46 is securely held in position by a retainer nut 48 threaded onto the upper end of the valve body 20.

The flow cage, balancing cylinder, and gland provide a combined support, guide and seat structure for the valve closure plug 48 and the associated stem 50, the stem being connected at its lower end by a pin 52 to the plug member 48 and connected at its upper end by a pin 54 to an actuating rod 56 associated with the diaphragm actuator 46.

The actuator assembly 46 may take any of a number of conventional forms. Typically, it comprises upper and lower shells 58 and 60 which peripherally clamp a flexible diaphragm 62 having a central reinforcing plate 64. The actuating rod 56 extends through the diaphragm 62, the reinforcement 64 and a pair of spacers 66 and 68 and is securely attached to these members by a nut 70. The actuator assembly is provided with an annular fitting 72 threaded onto the upper end of the tubular support 44. The usual interchangeable vent and pressure line connections 74 and 76 are provided to permit actuation of the diaphragm in either direction. A spring 77 is compressed between a fixed collar 79 and a collar 81 on the stem to bias valve toward closed position.

The flow cage 34 is formed with a plurality of circumferentially spaced flow passages 78 opposite the lower portion of the chamber 26 and a flow port 80 coaxially of the valve closure plug 48. The cross-sectional area of the flow port 80 is usually considerably less than the aggregate area of the flow ports 78 so that the principal pressure drop occurs across the former. Between the passages 78 and the flow port 80 the flow cage is provided with an internal conical seat 82 adapted to be engaged by the corresponding conical portion 84 of the plug 48. Since, as explained in detail below, the seating surfaces 82 and 84 are not subject to the usual erosion or abrasion nor to the closing impact normally associated with valves of this type, they may be made of a material which provides a high resistance to wear and yet has sufficient resilience to accommodate the slight dimensional changes occasioned by tight closure of the valve.

Below the seat 84 the closure 48 is provided with a cylindrical section 86 connected by a frusto-conical section 88 to a plug throttle nose having a cylindrical portion 90 and a smoothly tapered portion 92. The parts are so dimensioned that when the valve is fully closed the cylindrical section 90 extends into the flow port 80 and the end of the tapered section 92 projects slightly below the lower end of port 80. The cylindrical portion 90 is received with a free fit within the flow port 80 with a maximum diametral clearance in a typical case of .007". The purposes and advantages of this relationship will be developed more fully below in connection with the description of the over-all operation of the valve.

Above the seat 84, valve plug 48 is provided with a cylindrical collar 94 which, when the valve is fully opened, abuts the lower end of the balancing cylinder 48 to limit the opening movement of the valve. The main cylindrical body portion 96 of the plug is received with a close clearance fit within the central bore of the balancing cylinder 40, the parts being sealed by an O-ring 98 carried by the balancing cylinder.

The O-ring 98, together with the O-rings 41, 43 and 45 form a sealed balancing pressure chamber which is in communication with the region below the plug seating surface through a plurality of radial ports 100 which are connected to a vertical passage 102 in turn connected to a plurality of inclined passages 104 leading into the pressure balancing chamber. By proper selection of the area of the stem 50, the area bounded by the seal 98, the area bounded by the seat 82, 84, various conditions of balance or unbalance can readily be achieved to tailor the valve exactly to the expected service requirements. In the typical case the dimensions are so selected as to provide a slight unbalance in a direction to urge the valve member 48 to its closed position.

The operation of a valve having this dimensional relationship and with the passage 22 connected to a source of relatively high pressure and the passage 24 connected to a source of relatively low pressure, will now be considered in detail. When the valve is fully closed, the downstream pressure will act upwardly over an area bounded by the inner diameter of the seating surfaces 84 and 82 and because of the pressure balancing system the downstream pressure will act downwardly over an area bounded by the seal 98 less the area bounded by the seal 45. The upstream pressure will act downwardly over the area equal to the area of the outside diameter of the plug seat joint less the area bounded by the seal 98. In the illustrated valve these dimensions are such as to produce a slight unbalance tending to urge the valve to fully closed position.

As the actuator is energized to crack open the seating surfaces 82 and 84, the initial movement of the plug 48 is very rapid because the parts are initially essentially fully balanced. Since the cylindrical section of the plug throttle-nose extends a substantial distance into the flow port 80, for example, twice the width the plug-seat joint, flow through the valve and across the seating surfaces 82 and 84, is restricted because of the close clearance fit between the plug throttle nose and the flow port 80. This restriction takes the major portion of the pressure drop, and the velocity across the much larger flow area at the seat plug contact is greatly reduced thereby reducing abrasion-erosion. The high flow velocity is thus largely confined to the plug throttle nose and the flow port 80. Since these parts do not contact one another an extremely hard facing and brittle material may be applied in this region. The flow through the valve follows the seat port wall and is turned into the flow port 80 at which time flow path transfers from the port wall to the plug nose. Erosion occurs only on the plug nose. Erosion does not occur at the entrance to the seat port, in the flow port nor in the port exit. Thus, hard facing need be applied only to the plug throttle nose, greatly reducing the cost of parts. A further important advantage derived from this construction is that in the full open position of the valve, the flow port does not erode to increase the maximum flow capacity of the valve which could endanger the downstream equipment.

Abrasion and erosion are also reduced by the rapidity with which the plug and seat joint are separated or brought together on opening or closing. Flow is maintained at a low velocity until the seat joint is separated sufficiently to avoid danger of abrasion and cavitation of the seating surfaces. The rate of opening or closing is then slowed to normal and no damage occurs to the valve or piping from fluid shock or impact when the valve reaches full open or closed positions. Erosion is further reduced by the fact that the diameter of the seating surfaces is considerably larger than the diameter of the flow port which greatly reduces the flow velocity across the seat joint upon opening or closing.

This construction also permits variation of the port size without variation of the seat diameter and the diameter of the balancing cylinder. Thus, it is possible to balance the valve even when the diameter of the flow port is smaller than the diameter of the stem. Under these conditions a conventional valve would tend to open as line pressure increased thus reducing the force by which the seating surfaces are held together. The subject valve may be balanced for all port and stem sizes thus eliminating variations in thrust requirements for opening and closing the valve. Accordingly, the same control air signal may be used to actuate the valve despite variation in the internal dimensions of the valve. This eliminates the need for fine adjustments in the controller and the valve actuator mechanism.

Also, the balanced construction described above eliminates or materially reduces the variations in force required to open the valve resulting from a change in the upstream line pressure thus eliminating the requirement for manual adjustment of the valve actuator required in prior valves.

Considering further the operation of the specific valve disclosed herein, after the valve is cracked open, upstream pressure rapidly builds up in the cavity under the valve closure member creating an upward thrust which tends to unbalance the plug and sharply increases its opening velocity to further increase the flow area at the valve seat and reduce flow velocity in this region. This unbalance is rapidly offset by the vent system including the passages 100, 102 and 104 which builds up pressure above the plug to create a downward balancing thrust.

The flow capacity of the vent system as well as the size of the pressure balancing chamber above the valve closure member controls the time and the position of the valve closure member when the downward balancing thrust is established. As the plug throttle nose is raised, upstream pressure acts upwardly on it to create an additional opening thrust. However, before this thrust becomes significant, the valve is nearing full open position and upstream pressure is reduced due to body and cage flow restriction upstream of the seat. Therefore toward the end of the opening stroke the acceleration of the plug is reduced. The space above the piston decreases with valve opening to act as a snubber further reducing the upward velocity near the full open position. This permits the plug to stop in the full open position with normal actuator opening velocity and provides a smooth non-shock stop.

As the valve is moved towards closed position the space above the piston increases and fluid flows upward in the vent system to maintain equalized pressure across the plug. The normal closing velocity of the plug is higher than the normal opening velocity since it is effected partly under the influence of the spring 77.

As the plug throttle nose enters the flow port it restricts flow and builds up upstream pressure in the region beneath the seat which tends to unbalance the plug upwardly and sharply reduces its downward velocity before seating. Therefore, seating is effected smoothly and with light impact.

It will be appreciated that the performance of the valve including the relation of the plug stroke velocity and acceleration to the plug position and the relation between the fluid flow and the plug position can be controlled by proper sizing of the components and by changing the size, location, and capacity of the vent system. The operation of the valve may also be altered by changing the relationship between the stem area and the flow port area. In the above described example the stem area was slightly greater than the area of the flow port. When the stem area equals the flow port area or when the stem area is smaller than the flow port area the valve operates essentially in the same manner as that discussed above. Since the invention contemplates that in all cases the valve will be balanced or slightly unbalanced in a valve closing direction or in a valve opening direction the operation of the valve is not drastically changed by the adoption of any one of these conditions.

The most significant change in the operation of the valve can be effected by eliminating the radial ports 100 and continuing the vertical passage 102 down through the bottom end of the throttle nose plug. With this system, upstream pressure cannot enter the vents except by flowing past the throttle nose plug which is positioned in the flow port 80. Accordingly, the pressure above the flow port position remains essentially at the value of the upstream pressure creating a large unbalance initially thrusting the valve upward and producing an extremely rapid valve opening movement. This unbalance continues through a larger portion of the opening stroke since pressure cannot be equalized across the valve piston until the throttle nose is substantially entirely clear on the flow port 80. This very rapid opening effects a further reduction in erosion of the main seating surfaces but causes a hard open impact and thus limits the use of this system to installations in which the upstream pressure is 2,000 p.s.i. or less. Similarly on closing the valve it becomes quickly seated which may in some cases produce objectionable water hammer.

The operation of the valve is also changed when the flow condition is reversed, i.e., when the passages 24 and 22 are at the upstream and downstream sides of the valve, respectively. This application is normally limited to intermediate to low pressure drop service (1,500 p.s.i. or less). Under these conditions and with the vent located in the plug nose a force acting downwardly during the entire opening stroke is established which provides smooth opening and reduced plug velocity but increases the possibility of erosion at the seat faces. If the vent is located between the plug nose and the plug to seat joint the opening velocity is normal, and during the opening stroke pressure across the piston is equalized.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A valve construction comprising a body having inlet and outlet passages connected to a central cavity, a bore connecting said cavity to the exterior of said body, means providing a valve seat between said inlet and said outlet flow passages and a flow port between said valve seat and said outlet passage, said flow port being substantially smaller than said valve seat and there being a flow chamber between said valve seat and said flow port of substantially larger cross-section than the cross-section of said flow port, a valve closure member mounted for movement between open and closed positions within said valve body and having a seating surface adapted to sealingly engage said valve seat when said valve is closed, a throttle member rigid with said valve closure member and extending from one end of said closure member into said flow port and spaced from and in close clearance relation with said flow port when said valve is closed and being displaced out of said flow port when said valve is open, a power actuator connected to move said valve closure member between open and closed positions, fluid seals forming a sealed pressure chamber at the end of said valve closure member remote from said throttle member, passage means extending through said valve closure member, said passage means having an opening at one end in said pressure chamber and having an opening at its opposite end in the region of said closure member between said seating surface and said throttle member thereby connecting said pressure chamber to said flow chamber between said valve seat and said flow port in the valve closed position, the area of said valve seat and the area enclosed by said fluid seals being such that when said valve is closed said valve closure member is essentially balanced against movement toward and away from said closed position whereby said closure member may be moved by said actuator toward and away from said closed position rapidly, fluid passing through said passage means into and out of said pressure chamber to accelerate initial opening movement and final closing movement of said valve closure member.

2. The valve construction according to claim 1 together with a tubular assembly mounted in said bore, said valve seat, said flow chamber and said flow port being formed in said tubular assembly.

References Cited by the Examiner

UNITED STATES PATENTS

| | | | |
|---|---|---|---|
| 1,720,705 | 7/1929 | Waterman | 251—282 X |
| 1,825,864 | 10/1931 | Harter. | |
| 2,897,836 | 8/1959 | Peters et al. | 137—454.5 |
| 3,010,695 | 11/1961 | Banks | 251—282 X |
| 3,059,894 | 10/1962 | Knecht et al. | 251—121 |
| 3,110,320 | 11/1963 | Rosenberger | 251—123 X |

FOREIGN PATENTS

| | | |
|---|---|---|
| 1,240,350 | 7/1960 | France. |
| 763,842 | 12/1956 | Great Britain. |
| 791,078 | 2/1958 | Great Britain. |

M. CARY NELSON, *Primary Examiner.*

A. ROSENTHAL, *Assistant Examiner.*